United States Patent

Kim

[11] Patent Number: 5,950,137
[45] Date of Patent: Sep. 7, 1999

[54] METHOD FOR SUPPLYING SUBSCRIBER LOCATION INFORMATION IN A MOBILE COMMUNICATIONS SYSTEM

[75] Inventor: Young-Je Kim, Incheon, Rep. of Korea

[73] Assignee: Daewoo Telecom, Ltd., Incheon, Rep. of Korea

[21] Appl. No.: 08/931,352

[22] Filed: Sep. 16, 1997

[30] Foreign Application Priority Data

Sep. 17, 1996 [KR] Rep. of Korea ............... 96-40403

[51] Int. Cl.⁶ ............................................... H04Q 7/20
[52] U.S. Cl. ........................ 455/456; 455/457; 701/300
[58] Field of Search .................................. 455/456, 433, 455/404, 435, 457, 422, 432, 436, 566, 12.1, 414, 427, 458; 342/450, 457; 379/201; 701/300

[56] References Cited

U.S. PATENT DOCUMENTS

| | | | |
|---|---|---|---|
| 4,700,374 | 10/1987 | Bini | 455/456 |
| 5,218,716 | 6/1993 | Comroe et al. | 455/456 |
| 5,327,144 | 7/1994 | Stilp et al. | 342/457 |
| 5,432,841 | 7/1995 | Rimer | 455/456 |
| 5,485,163 | 1/1996 | Singer et al. | 455/433 |
| 5,561,704 | 10/1996 | Salimando | 455/456 |
| 5,576,716 | 11/1996 | Sadler | 342/457 |
| 5,697,064 | 12/1997 | Okamoto et al. | 455/456 |
| 5,736,964 | 4/1998 | Ghosh et al. | 342/457 |
| 5,809,424 | 9/1998 | Eizenhoefer | 455/456 |
| 5,815,538 | 9/1998 | Grell et al. | 701/300 |
| 5,844,522 | 12/1998 | Sheffer et al. | 342/457 |
| 5,884,221 | 3/1999 | Wortham | 701/300 |

*Primary Examiner*—Dwayne D. Bost
*Assistant Examiner*—Quochien B. Vuong
*Attorney, Agent, or Firm*—Pennie & Edmonds LLP

[57] ABSTRACT

A method, for use in a mobile communications system having a plurality of mobile stations (MS's) and a mobile subscriber information register (MSIR), provides a requesting MS with location information (LI) of a target MS. At a first step, a LI request signal, including a subscriber number assigned to the target MS, a service code representing a LI supplying service and a secret number, is received from the requesting MS. At a second step, it is checked whether the service code of the LI supplying service is included in the subscriber information of the target MS stored in the MSIR. At a third step, if the service code of the LI supplying service is included in the subscriber information of the target MS, it is checked whether the secret numbers included in the subscriber information of the target MS and the LI request signal are identical each other. At a fourth step, if the secret numbers included in the subscriber information of the target MS and in the LI request signal are identical, the LI of the target MS is retrieved from the MSIR. At a fifth step, a current location of the target MS is checked. At a sixth step, it is checked whether the current location and the location represented by the retrieved LI of the target MS are identical. At a final step, if the determination, result obtained in the sixth step is affirmative, the retrieved LI is sent to the requesting MS.

6 Claims, 4 Drawing Sheets

FIG. 2

| | |
|---|---|
| OCTET 1 | LATITUDE INFORMATION |
| OCTET 2 | |
| OCTET 3 | |
| OCTET 4 | LONGITUDE INFORMATION |
| OCTET 5 | |
| OCTET 6 | |
| OCTET 7 | RESOLUTION INFORMATION |

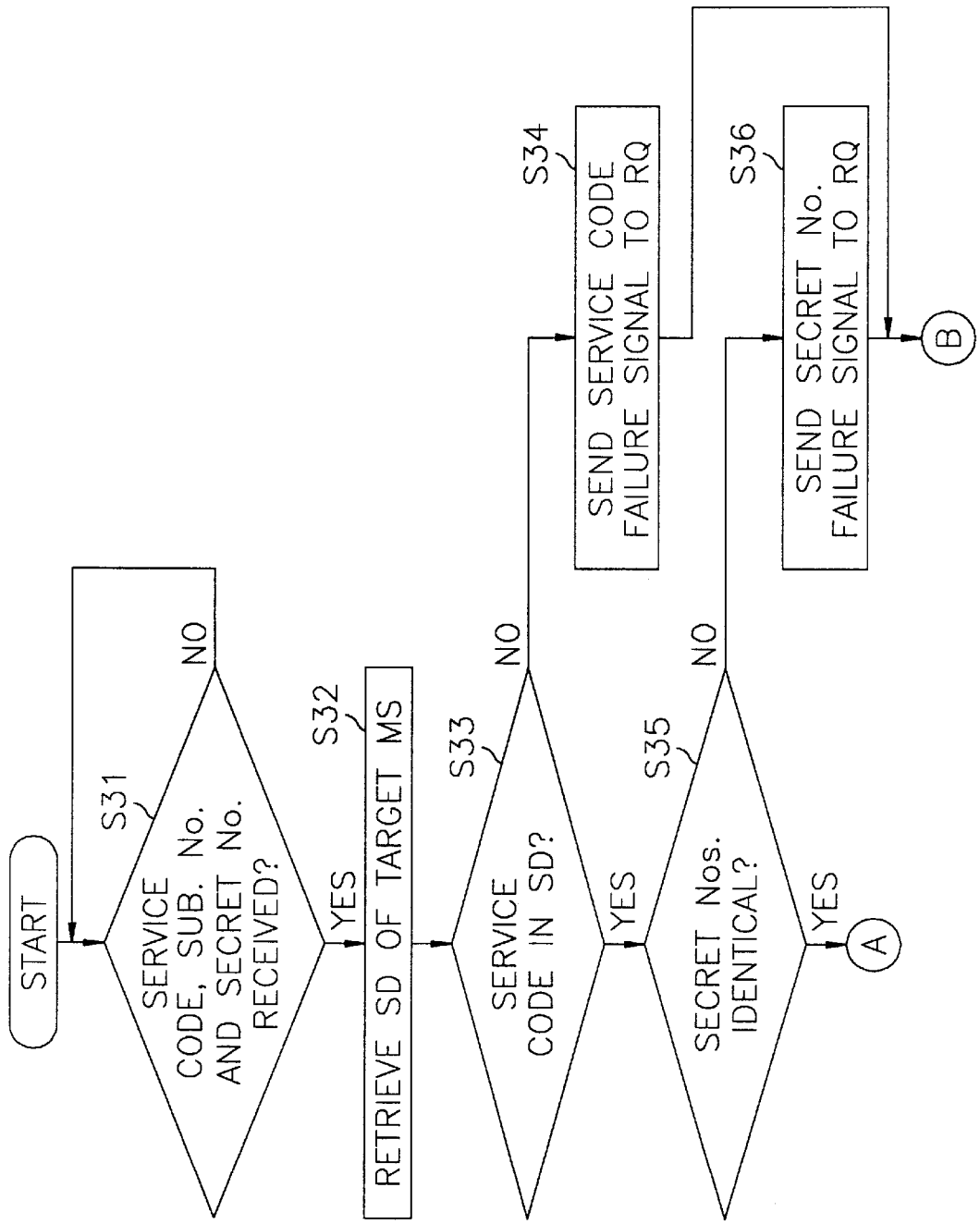

METHOD FOR SUPPLYING SUBSCRIBER LOCATION INFORMATION IN A MOBILE COMMUNICATIONS SYSTEM

FIELD OF THE INVENTION

The present invention relates to a mobile communications system; and, more particularly, to a method for supplying a mobile station with information on subscriber location registered in advance.

BACKGROUND OF THE INVENTION

As is well known, a mobile communications system (MCS) offers various services, such as a cellular phone service, a radio pager service and the like, to mobile subscribers connected to the MCS by radio. Basic components of the MCS comprise a plurality of mobile stations (MS's), a multiplicity of base station subsystems (BSS's), a number of mobile switching centers (MSC's) and a mobile subscriber information register (MSIR).

A MS is a subscriber portable terminal assigned to a mobile subscriber. Each of the BSS's includes resources providing channels between each of the MSC's coupled thereto and the MS's within a service area thereof. Each of the MSC's is capable of handling voice and/or data transmitted from the subscribers connected thereto. Each of the MSC's is coupled to a transit network (TN), the TN comprising one or more electronic switching systems to be used for relaying voice and/or data between a public switched telephone network (PSTN) (not shown) and each of the MSC's and between the MSC's.

The MSIR registers subscriber information for the mobile subscribers. The MSIR is connected to each of the MSC's through the TN. The subscriber information for each of the mobile subscribers includes a subscriber number, subscriber data (SD), and location information (LI). The SD includes services available to each of the mobile subscribers. The LI represents a location where a MS assigned to each of the mobile subscribers has performed a last location registration. The LI is registered in a predetermined format including, e.g., a MS location parameter of latitude, longitude and resolution information.

The LI of the conventional MCS described above, however, is dedicated in positioning the MS's by the MCS and cannot be accessed by an individual subscriber. As a result, when a mobile subscriber wants the location of the MS of another mobile subscriber, it will be necessary to set up a call with the MS to find out the location thereof, even though the LI of the MS of the other mobile subscriber is registered in the MSIR.

SUMMARY OF THE INVENTION

It is, therefore, a primary object of the present invention to provide a method for use in a MCS for capable of supplying a MS with the LI of another MS.

In accordance with the present invention, there is provided a method, for use in a MCS having a plurality of MS's and a MSIR, for providing a requesting MS with LI of a target MS, wherein the MSIR stores subscriber information for each MS, the subscriber information for the target MS including a subscriber number and the LI of the target MS, service codes representing services available to the target MS and a secret number, comprising the steps of:

(a) receiving from the requesting MS a LI request signal, wherein the LI request signal includes a subscriber number assigned to the target MS, a service code representing a LI supplying service and a secret number;

(b) checking whether the service code of the LI supplying service is included in the subscriber information of the target MS stored in the MSIR;

(c) if the service code of the LI supplying service is included in the subscriber information of the target MS, checking whether the secret number included in the subscriber information of the target MS and that included in the LI request signal are identical each other;

(d) if the secret numbers included in the subscriber information of the target MS and in the LI request signal are identical, retrieving the LI of the target MS from the MSIR;

(e) checking a current location of the target MS;

(f) determining whether the current location and the location represented by the retrieved LI of the target MS are identical; and (g) if the determination result obtained in step (f) is affirmative, sending the retrieved LI to the requesting MS as the current LI of the target MS.

BRIEF DESCRIPTION OF THE DRAWINGS

The above and other objects and features of the present invention will become apparent from the following description of preferred embodiments given in conjunction with the accompanying drawings, in which:

FIG. 2 shows an exemplary format of a MS location parameter; and

FIGS. 3A and 3B provide flow charts illustrating the procedure for supplying the LI in accordance with the present invention.

DETAILED DESCRIPTION OF THE PREFERRED EMBODIMENTS

Figure 1:
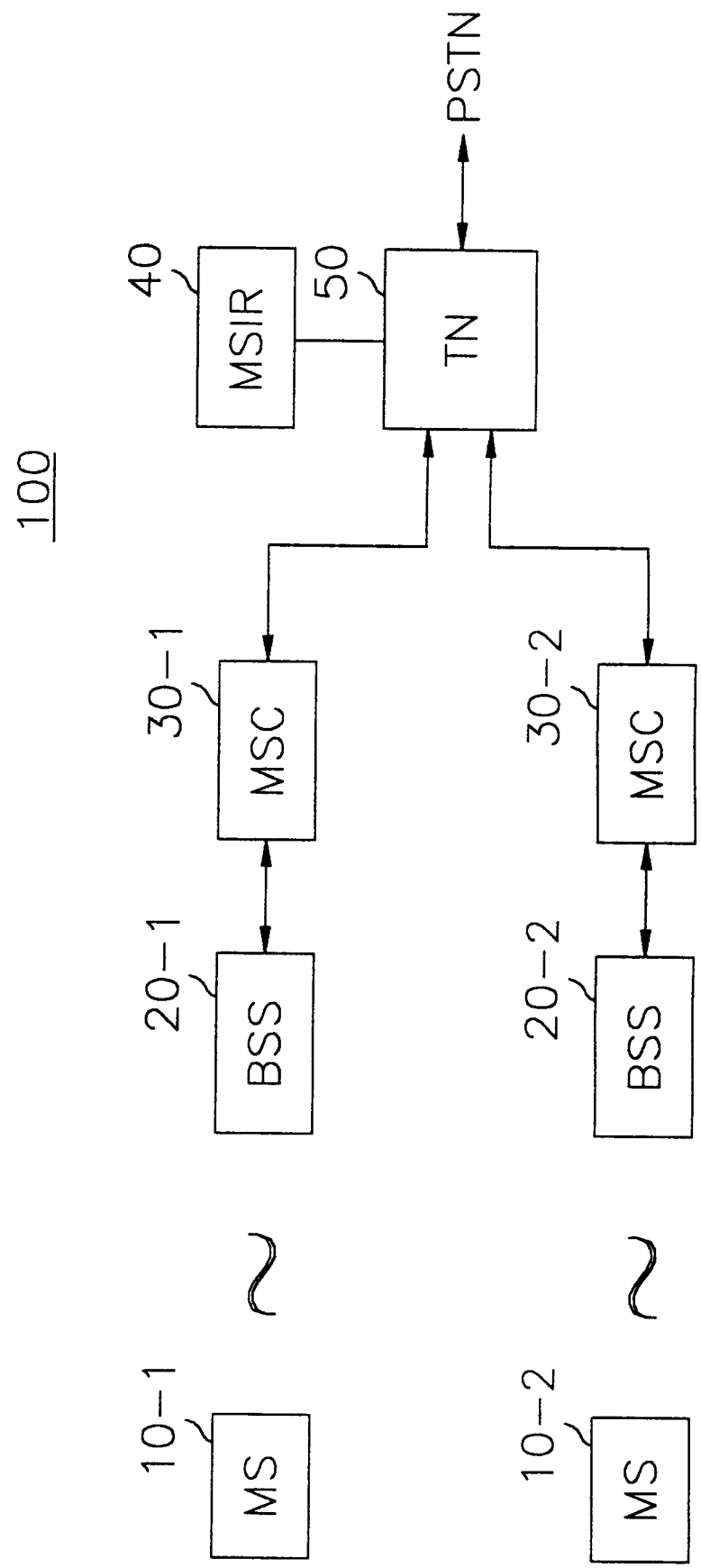
FIG. 1 presents a schematic block diagram of a MCS.

Referring to FIG. 1, there is provided a block diagram of a MCS 100. The MCS 100 comprises a plurality of mobile stations (MS's) 10-1 to 10-2, a multiplicity of base station subsystems (BSS's) 20-1 to 20-2, a plural number of mobile switching centers (MSC's) 30-1 to 30-2 and a mobile subscriber information register (MSIR) 40. For the sake of illustration, the inventive method will be described with reference to two MSC's 30-1 and 30-2 selected from a plurality of MSC's within the MCS 100, two BSS's 20-1 and 20-2 chosen from multiple BSS's coupled with the MSC 30-1 and from multiple BSS's coupled with the MSC 30-2, respectively, and two MS's 10-1 and 10-2 out of those coupled with the BSS's 20-1 and 20-2, respectively, through a radio interface.

A MS is a subscriber portable terminal assigned to a mobile subscriber. The BSS's 20-1 and 20-2 include resources providing a channel between the MSC 30-1 and the MS 10-1 and the one between the MSC 30-2 and the MS 10-2, respectively. The MSC's 30-1 and 30-2 are capable of handling voice and/or data transmitted from the subscribers connected thereto. Each of the MSC's 30-1 and 30-2 is coupled to a transit network (TN) 40, the TN 50 comprising one or more electronic switching systems to be used for relaying voice and/or data between a public switched telephone network (PSTN) (not shown) and each of the MSC's 30-1 and 30-2 and,between the MSC's 30-1 and 30-2.

The MSIR 40 registers subscriber information for the mobile subscribers. The MSIR 40 is connected to each of the MSC's 30-1 and 30-2 through the TN 50. The subscriber information for each of the mobile subscribers includes a subscriber number, location information (LI) and subscriber data (SD). The LI of a MS may be represented by the location of a BSS when the MS is positioned within the service area of the BSS. Since the identification of the BSS to which the MS belongs or the registration of the LI for the MS can be made in a conventional manner by the signalling between the MS and the BSS and a handoff process, details thereof will not be described here for the sake of simplicity. In another instance, if an absolute location of the MS can be detected, the LI of the MS can be represented by a MS location parameter of a latitude, a longitude and a resolution and is registered in a predetermined format as shown in FIG. 2. Referring to FIG. 2, there is illustrated the format of the MS location parameter representing the location of the MS. As shown in FIG. 2, the length of the location parameter is 7 octets. 3 octets are used for representing the latitude information of the MS. And another 3 octets are used for representing the longitude information of the MS. And the remaining 1 octet is used for representing the resolution information for the latitude and the longitude location measurements.

The latitude and the longitude information fields are signed integers specifying the estimated MS location in unit of tenth of a second. The range of the latitude is ±324,000 seconds; the range of the longitude is ±648,000 seconds. A positive latitude implies a North latitude; a positive longitude implies a West longitude. A negative value is represented in a form of the 2's complement.

The resolution information field is expressed in foot, wherein the MS will be located, in, e.g., 90% confidence level, within a circle centered at the latitude and the longitude whose radius is given by the resolution information.

The SD includes service codes representing services available to each of the mobile subscribers. When the mobile subscriber registers on the LI supplying service, a service code representing the LI supplying service and a secret number are included in the SD. In other words, when a requesting mobile subscriber (RQ) requests the LI of a target MS assigned to a target mobile subscriber (TG) registered on the LI supplying service, the LI of the target MS is provided only to the RQ who can provide the secret number of the TG.

Referring back to FIG. 1, when the RQ requests the LI of the target MS, the RQ inputs a LI request signal including a service code representing the LI supplying service and the subscriber and the secret numbers for the target MS. The RQ may request the LI of his own MS, i.e., the subscriber number of the target MS may be same as that for the RQ. For the sake of the illustration, it is assumed that the RQ is the mobile subscriber of the MS 10-1 and the target MS is the MS 10-2.

The LI request signal is transmitted from the MS 10-1 via the radio interface to the BSS 20-1. As is well known in the art, the BSS 20-1 performs a conventional radio frequency signal processing and a signal format conversion from the format of the MS 10-1 to that of the MSC 30-1. And then, the LI request signal from the MS 10-1 is finally received by the MSC 30-1 through the BSS 20-1.

In response to the LI request signal, the MSC 30-1 retrieves the SD of the target MS 10-2 registered in the MSIR 40 to check whether or not the target MS 10-2 is registered for the LI supplying service, i.e., the LI supplying service code is included in the SD of the MS 10-2.

Then, the MSC 30-1 compares the secret number from the MS 10-1 with the secret number in the SD of the MS 10-2 to check whether or not the two numbers are identical each other; and then the MSC 30-1 retrieves the LI of the MS 10-2.

If the LI represents, for example, that the MS 10-2 is located within reach of the BSS 20-2, the MSC 30-1 requests the MSC 30-2 to check whether or not the MS 10-2 is within reach thereof and also whether or not its power is on currently. For example, the MSC 30-1 sends a location confirmation request signal to the MSC 30-2. The MSC 30-2 confirms the location of the MS 10-2 using a conventional order procedure which requests a response from the MS 10-2. When the response is received from the MS 10-2, the MSC 30-2 sends a location confirmation signal to the MSC 30-1. When the MSC 30-1 receives the location confirmation signal, the MSC 30-1 sends the LI of the MS 10-2 to the MS 10-1 through the BSS 20-1. The MS 10-1 may be constructed to display the location of the MS 10-2 on a display thereof based on the LI of the MS 10-2.

Figure 3B:
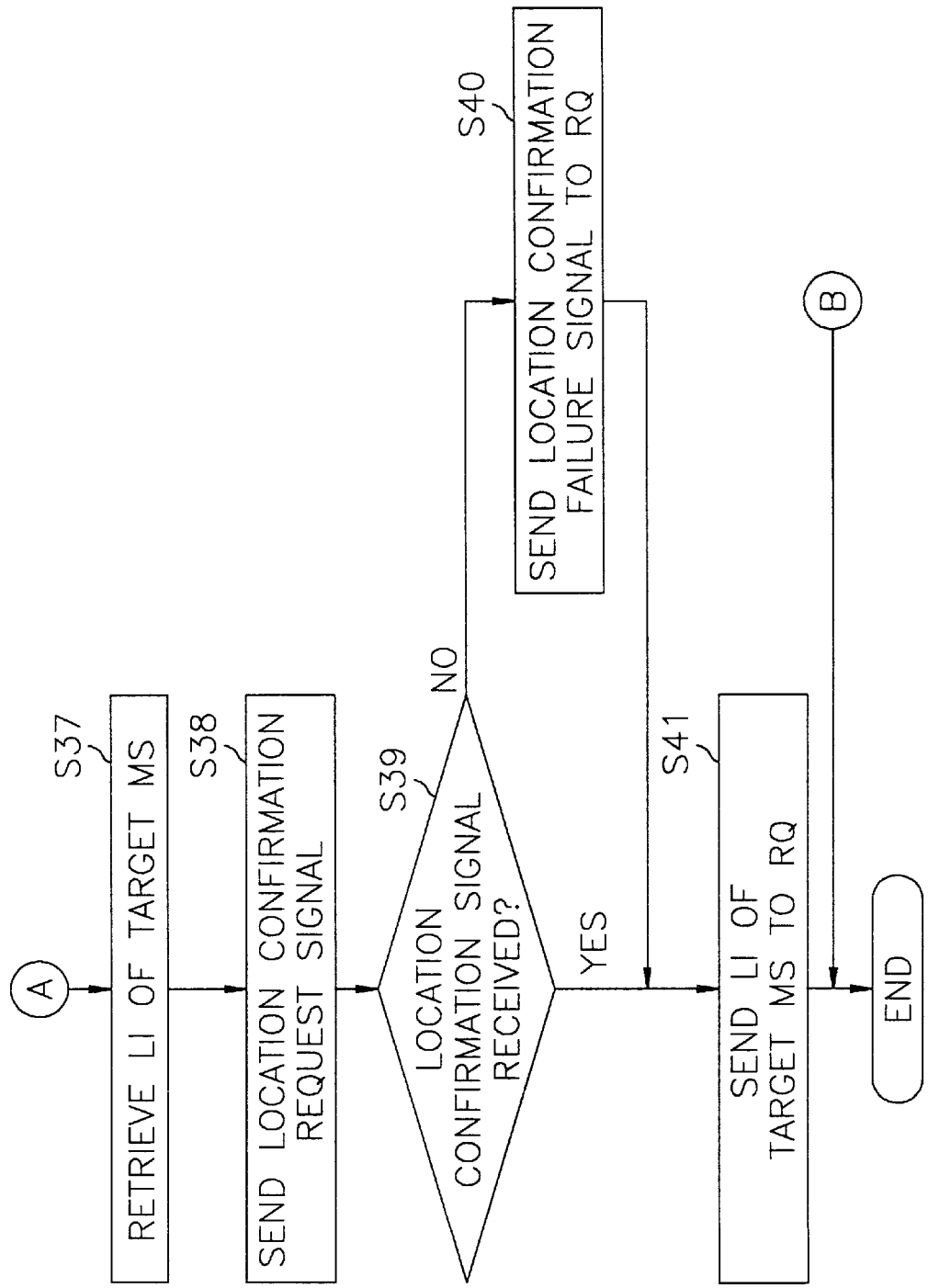

Referring to FIGS. 3A and 3B, there is illustrated a procedure for supplying the location information in accordance with the present invention.

At step S31, the inventive process is initiated, e.g., when the LI request signal including the service code representing the LI supplying service, the subscriber number and the secret number of the MS 10-2 is provided from the MS 10-1 to the MSC 30-1 through the BSS 20-1. At step S32, the MSC 30-1 retrieves the SD of the target MS 10-2 stored in the MSIR 40 and the process proceeds to step S33.

At step S33, the MSC 30-1 checks if the service code is included in the SD of the target MS 10-2. If the service code is included in the SD of the MS 10-2, the process goes to step S35; but if not, it proceeds to step S34, wherein the MSC 30-1 sends a service code failure signal to the MS 10-1, and the process is terminated. The service code failure signal represents a voice or an image signal capable of informing the RQ of the MS 10-1 that the service cannot be provided because the target MS is not registered for the LI supplying service.

At step S35, the secret number received from the MS 10-1 is compared with the secret number of the target MS 10-2, registered in the MSIR 40. If the two numbers are identical, the process goes to step S37 in FIG. 3B; otherwise, it proceeds to step S36, wherein the MSC 30-1 sends a secret number failure signal to the MS 10-1, and the process is terminated. The secret number failure signal represents a voice or an image signal capable of informing the RQ of the MS 10-1 that the LI supplying service cannot be provided because the received secret number is not identical to the one registered in the MSIR 40.

At step S37 shown in FIG. 3B, the MSC 30-1 retrieves the LI of the MS 10-2 stored in the MSIR 40 and traces a BSS, e.g., the BSS 20-2, indicated by the LI of the target MS 10-2. After determining the BSS corresponding to the LI, the MSC 30-1 further decides a MSC, e.g., the MSC 30-2, coupled with the determined BSS 20-2. At step S38, the MSC 30-1 generates a location confirmation request signal to the MSC 30-2 and goes to step S39.

At step S39, the MSC 30-1 waits for the location confirmation signal from the MSC 30-2 for a predetermined time period. If the location confirmation signal is received by the MSC 30-1 within the predetermined time period, the process goes to step S41; otherwise, the process proceeds to step S40, wherein the MSC 30-1 sends a location confirmation failure signal to the MS 10-1 via the BSS 20-1 and proceeds to step S41. The location confirmation failure signal represents a voice or an image signal capable of informing the RQ of the MS 10-1 that the LI to be provided represents the latest location of the MS 10-2 and that the target MS 10-2 is out of reach or its power is off currently. At step S41, the MSC 30-1 sends the LI of the MS 10-2 to the MS 10-1 as current location information of the target MS 10-2; and the process terminates.

While the present invention has been shown and described with respect to the particular embodiments, it will be apparent to those skilled in the art that many changes and modifications may be made without departing from the spirit and scope of the invention as defined in the appended claims.

What is claimed is:

1. A method, for use in a mobile communications system having a plurality of mobile stations (MS's) and a mobile subscriber information register (MSIR), for providing a requesting MS with location information of a target MS, wherein the MSIR stores subscriber information for each MS, the subscriber information for the target MS including a subscriber number and the location information of the target MS and service codes representing services available to the target MS, the method comprising the steps of:

(a) receiving from the requesting MS a location information request signal, wherein the location information request signal includes a subscriber number assigned to the target MS and a service code representing a location information supplying service;

(b) checking whether the service code representing the location information supplying service is included in the subscriber information of the target MS stored in the MSIR;

(c) if the service code representing the location information supplying service is included in the subscriber information of the target MS, retrieving the location information of the target MS from the MSIR;

(d) checking a current location of the target MS;

(e) determining whether the current location and the location represented by the retrieved location information of the target MS are identical; and (f) if the determination result obtained in step (e) is affirmative, sending the retrieved location information to the requesting MS as the current location information of the target MS.

2. The method of claim 1, further comprising, after the step (c), the step of (c1) if the service code representing the location information supplying service is not included in the subscriber information of the target MS, sending a service code failure signal to the requesting MS.

3. The method of claim 2, further comprising, after the step (f), the step of: (g) if the determination result obtained in the step (e) is negative, sending a location confirmation failure signal and the retrieved location information to the requesting MS.

4. A method, for use in a mobile communications system having a plurality of mobile stations (MS's) and a mobile subscriber information register (MSIR), for providing a requesting MS with location information of a target MS, wherein the MSIR stores subscriber information for each MS, the subscriber information for the target MS including a subscriber number and the location information of the target MS, service codes representing services available to the target MS and a secret number, the method comprising the steps of:

(a) receiving from the requesting MS a location information request signal, wherein the location information request signal includes a subscriber number assigned to the target MS, a service code representing a location information supplying service and a secret number;

(b) checking whether the service code of the location information supplying service is included in the subscriber information of the target MS stored in the MSIR;

(c) if the service code of the location information supplying service is included in the subscriber information of the target MS, checking whether the secret number included in the subscriber information of the target MS and that included in the location information request signal are identical each other;

(d) if the secret numbers included in the subscriber information of the target MS and in the location information request signal are identical, retrieving the location information of the target MS from the MSIR;

(e) checking a current location of the target MS;

(f) determining whether the current location and the location represented by the retrieved location information of the target MS are identical; and (g) if the determination result obtained in step (f) is affirmative, sending the retrieved location information to the requesting MS as the current location information of the target MS.

5. The method of claim 4, further comprising, after the step (c), the steps of:

(c1) if the service code of the location information supplying service is not included in the subscriber information of the target MS, sending a service code failure signal to the requesting MS; and (c2) if the secret numbers included in the subscriber information of the target MS and in the location information request signal are not identical each other, sending a secret number failure signal to the requesting MS.

6. The method of claim 5, further comprising, after step (g), the step of: (h) if the determination result obtained in step (f) is negative, sending a location confirmation failure signal and the retrieved location information to the requesting MS.

* * * * *